US006806944B2

United States Patent
Votipka et al.

(10) Patent No.: US 6,806,944 B2
(45) Date of Patent: Oct. 19, 2004

(54) IMAGING DEVICE AND COVER THEREFOR

(75) Inventors: Bruce Votipka, Fort Collins, CO (US); David W. Mayer, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/382,802

(22) Filed: Mar. 6, 2003

(65) Prior Publication Data
US 2004/0174515 A1 Sep. 9, 2004

(51) Int. Cl.[7] .......................... G03B 27/62; E05D 7/06; E05D 7/10; E05D 7/12
(52) U.S. Cl. .......................... 355/75; 16/239; 16/266; 16/272
(58) Field of Search ..................... 355/75; 358/474; 16/239, 266, 272; 353/126

(56) References Cited

U.S. PATENT DOCUMENTS

| RE30,878 E | * | 3/1982 | Wakeman ..................... 355/75 |
| 5,265,310 A | | 11/1993 | Ichinokawa |
| 5,812,285 A | | 9/1998 | Lin et al. |
| 6,163,927 A | | 12/2000 | Leu |
| 6,363,576 B1 | | 4/2002 | Hsu et al. |
| 2004/0032578 A1 | * | 2/2004 | Chen ........................... 355/75 |

* cited by examiner

Primary Examiner—Rodney Fuller

(57) ABSTRACT

Imaging device and cover therefor. One embodiment of the imaging device comprises a frame assembly and at least one hinge releasably mounted to the frame assembly. The at least one hinge pivotally couples the frame assembly in one location on the imaging device. The at least one hinge is readily removable from the frame assembly and remountable to couple the frame assembly in another location on the imaging device.

24 Claims, 5 Drawing Sheets

IMAGING DEVICE AND COVER THEREFOR

FIELD OF THE INVENTION

The invention generally pertains to imaging devices, and more specifically, to covers for imaging devices.

BACKGROUND OF THE INVENTION

Imaging devices, such as copiers, facsimile machines, and scanners, are widely used for converting images (e.g., photographs, text) into machine-readable signals representative of the image. The image is typically placed on a transparent platen or imaging surface. During an imaging operation, the image is illuminated and light reflected from the image is converted to electronic signals representative of the image.

Illumination and optical systems for the imaging operation are typically arranged underneath the imaging surface. The illumination system may include a light source (e.g., a fluorescent or incandescent lamp) for illuminating the image on the imaging surface. Light reflected by the image is focused by a lens and/or mirror assembly onto a photosensitive detector. Alternatively, a "contact image sensor" (CIS) may be used to collect and focus reflected light onto the photosensitive detector.

The photosensitive detector (e.g., a charge-coupled device (CCD)) may comprise an array of individual cells, each of which builds-up or accumulates an electrical charge in response to exposure to light. The accumulated electrical charge in any given cell is proportional to the intensity and duration of the light exposure. Thus, the electrical signal is indicative of varying shades of light and is representative of the image.

A lid or cover may be provided for the imaging device and serves to block light emitted by the illumination system from the eyes of the user during the imaging operation. The cover also serves as a light shield, shielding the image from back-lighting by external light sources that could otherwise distort the image. The cover may also serve to hold the image in place on the imaging surface during the imaging operation.

The cover is hinged on one side of the housing so that it can be pivotally opened and closed by the user. That is, the user may lift the cover, opening it to one side and exposing the imaging surface. After placing the image on the imaging surface, the user may close the cover and begin the imaging operation. However, as the cover is only hinged on one side of the imaging device, the imaging device must be arranged so that the cover can be opened without compromising access to the imaging surface.

Access to the imaging surface may be compromised when the imaging device is placed adjacent one or more vertical surfaces, such as when the imaging device is placed adjacent a printer on one side and adjacent a wall on the other side. Opening the cover when the imaging device is so arranged may block access from yet another side, forcing the user to access the imaging surface from only one side of the imaging device. To enable access from more than one side, the user must reposition the imaging device so that the cover opens toward one of the vertical surfaces.

In some circumstances, however, repositioning the imaging device may be difficult or may not even be possible. For example, the size of the table or cabling may prevent the user from repositioning the imaging device.

Alternatively, some imaging devices are provided with a cover that can be removed entirely from the imaging device. However, removing the cover defeats the purpose of providing a cover for the imaging device, as explained above.

SUMMARY OF THE INVENTION

An imaging device, comprising a frame assembly and at least one hinge releasably mounted to the frame assembly. The at least one hinge pivotally couples the frame assembly in one location on the imaging device. The at least one hinge is readily removable from the frame assembly and remountable to couple the frame assembly in another location on the imaging device.

A method for changing the location of a cover on an imaging device, comprising sliding a hinge Out of a first receiving chamber to remove the cover from a first location on the imaging device, and sliding the hinge into a second receiving chamber to replace the cover in a second location on the imaging device.

BRIEF DESCRIPTION OF THE INVENTION

Illustrative and presently preferred embodiments of the invention are shown in the drawings, in which.

DETAILED DESCRIPTION

Cover 10 for use with an imaging device 12 (FIG. 1 and FIG. 2) is shown and described herein according to embodiments of the invention. Briefly, imaging device 12 is used to create images of negatives photographs, text, objects, and the like, and to convert the images into machine-readable signals that are representative of the images. These machine-readable signals may be stored as one or more electronic files (e.g., in computer-readable storage), displayed on suitable display devices (e.g., a computer monitor), or reconverted to paper format to make paper copies of the image.

Figure 1:
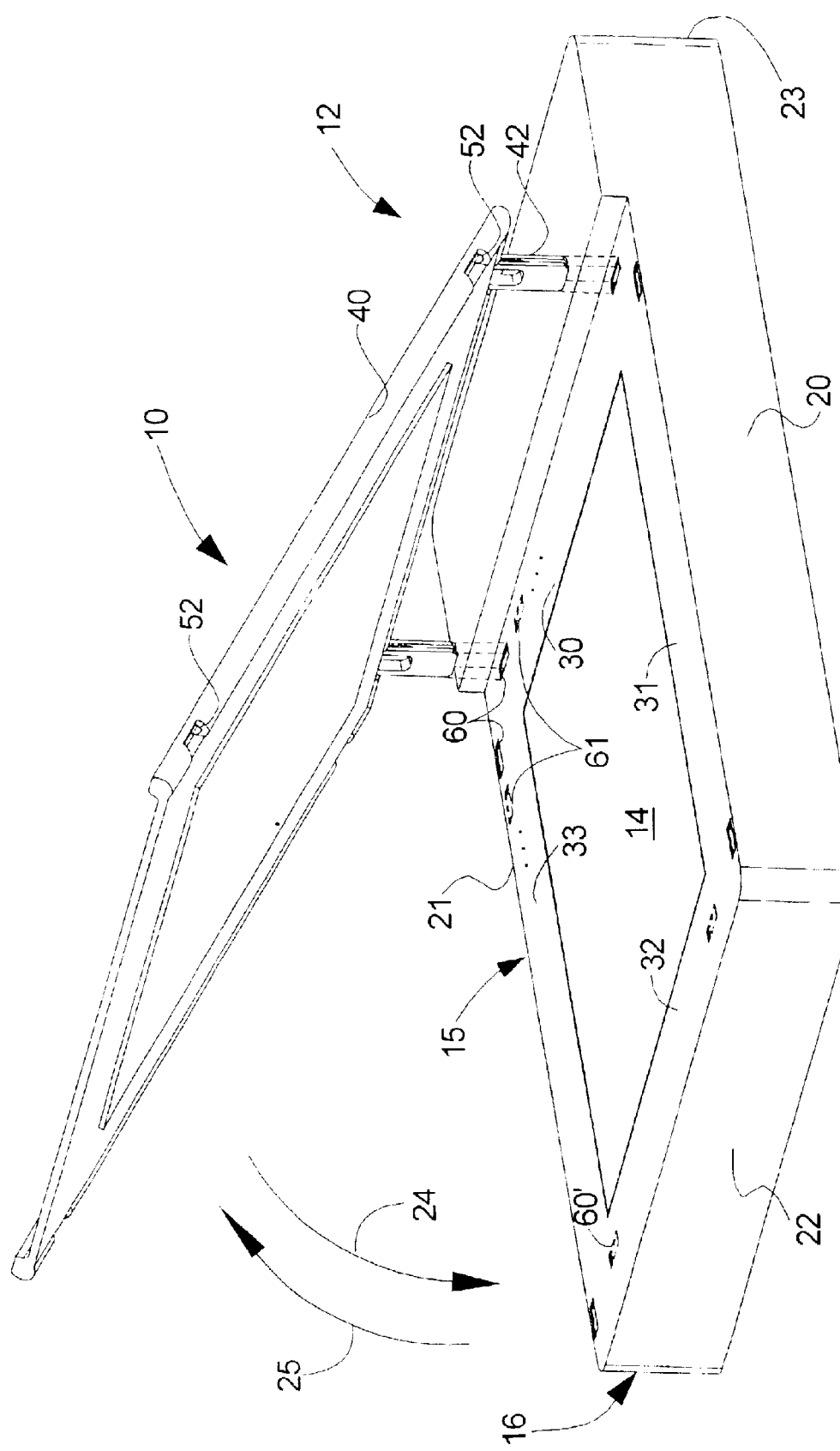
FIG. 1 is a perspective view of one embodiment of an imaging device and a cover therefor, wherein the cover is shown hinged to open and close in one orientation.
Figure 2:
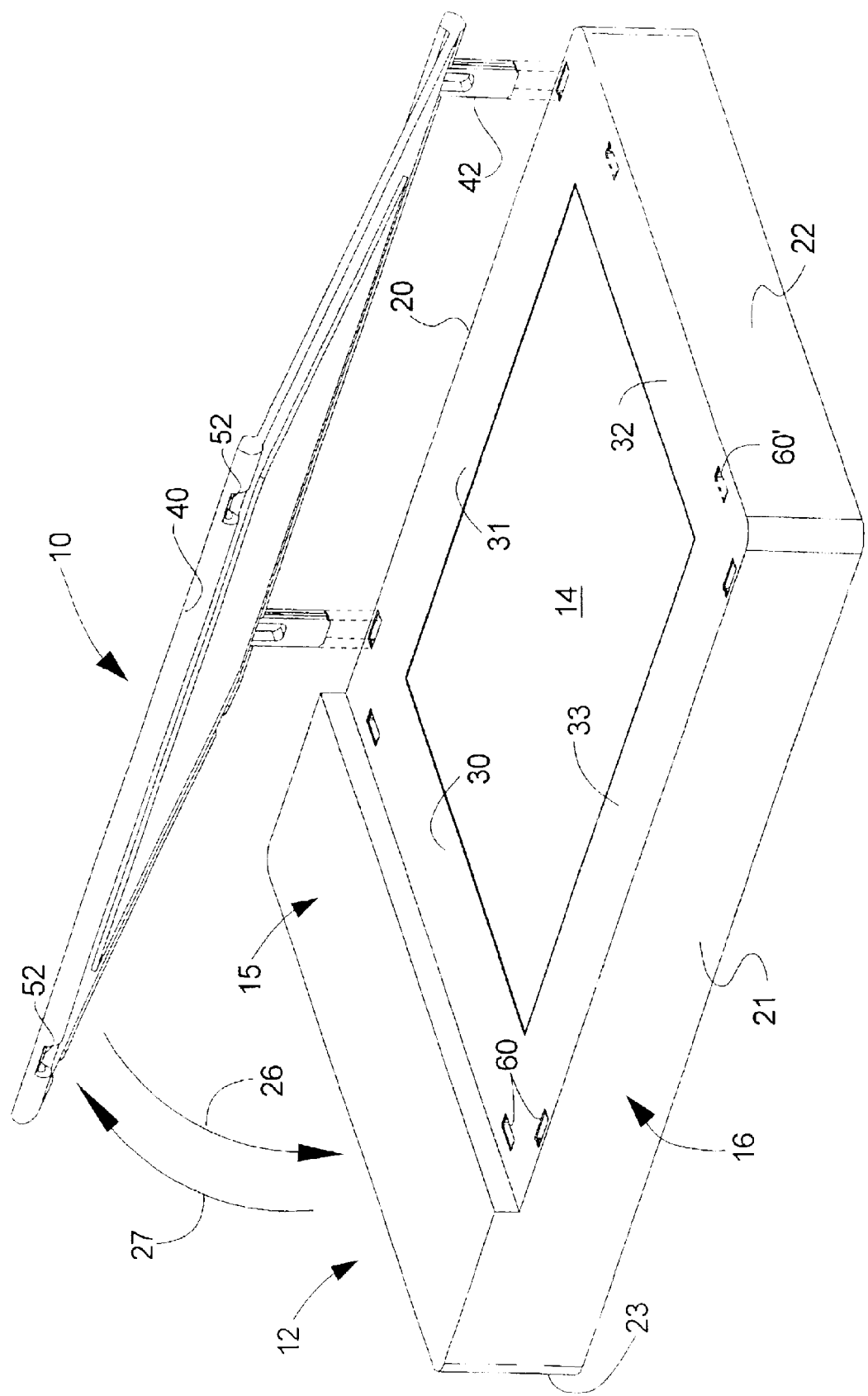
FIG. 2 is a perspective view of the imaging device and cover shown in FIG. 1, wherein the cover is shown hinged to open and close in another orientation.

Imaging devices 12, such as that shown in FIG. 1 and FIG. 2, may include by way of example, flatbed scanners, facsimile machines, and copier machines. Such imaging devices 12 comprise a transparent platen or imaging surface 14. An object may be placed on the imaging surface 14 to be scanned and/or copied during the imaging operation. Various systems and components may also be provided for operation of the imaging device 12.

By way of illustration, the imaging device 12 may be provided with suitable illumination and optical systems for use during the imaging operation. These illumination and optical systems illuminate the object on the imaging surface 14 and collect the reflected light from the object for conversion into electronic signals that are representative of the created image of the object. Illumination and optical systems, such as these, are well-known in the art and therefore are not discussed in further detail herein.

Imaging device 12 may also be provided with a suitable housing 16. In addition to serving an aesthetic purpose, housing 16 may also serve to protect the illumination and optical systems, as well as other circuitry and components, from the environment (e.g., dust). For example, the illumination and optical systems may be arranged in housing 16 beneath the imaging surface 14 to illuminate the image placed thereon during the imaging operation.

The housing 16 may be generally rectangular, although other configurations are also possible (e.g., square). For example, the housing 16 may comprise two longer side panels 20, 21, and two shorter side panels 22, 23. A cover 10 may be pivotally mounted to the housing 16 adjacent the imaging surface 14.

Cover 10 may serve as a light shield against back-lighting of the image by external light sources. Cover 10 may also serve to block light from the illumination system that may be leaked about the periphery of the object during the imaging operation from reaching the eyes of the user. Cover 10 may also serve to hold the object to be imaged in place on the imaging surface during the imaging operation.

It is noted that housing 16 and cover 10 may be made of any suitable material, and are typically fabricated from a lightweight plastic material.

The foregoing description of the imaging device 12 is provided in order to better understand one of many environments and configurations in which embodiments of the present invention may be used.

According to embodiments of the invention, cover 10 is mounted to the main body 15 of imaging device 12 in different locations. In FIG. 1, for example, cover 10 is mounted on side 30 adjacent the imaging surface 14 so that it can be moved between open and closed positions in a "portrait" orientation (illustrated by arrows 24, 25). Cover 10 may be removed from imaging device 12 and remounted to another side (e.g., 31) of the imaging surface 14, as shown in FIG. 2, so that cover 10 can be moved between open and closed positions in a "landscape" orientation (illustrated by arrows 26, 27).

Yet other embodiments are also contemplated, in which cover 10 may be readily removed from and mounted to any of the sides 30, 31, 32, and 33 of imaging device 10. It is noted that changing the cover to be mounted in different locations adjacent the imaging surface 14 is not limited to different orientations. By way of example, cover 10 may be mounted to the main body 15 of imaging device 12 in a landscape orientation (e.g., as shown in FIG. 1), and the mounting changed so that the cover 10 opens in on the opposite side, but still in a landscape orientation (e.g., when cover 10 is hinged to the opposite side 32 of the main body 15). In another exemplary embodiment, the cover 10 may be mounted in different locations along the same side of the main body 15, as will be explained below.

One embodiment of cover 10 comprises a frame assembly 40, and one or more hinges 42 releasably mounted thereto. The hinge(s) 42 pivotally couple the frame assembly 40 to the main body 15 of imaging device 12 (e.g., shown in FIG. 1). The hinges 42 can be readily removed from the frame assembly 40 and main body 15, and then remounted to pivotally couple the cover 10 in another location on the imaging device 12. Preferably, changing the mounting location of the cover 10 can be accomplished according to the teachings of the present invention without the use of tools, which will become apparent daring the following discussion.

Cover 10 is coupled to one side of the main body 15 of the imaging device 12 with two hinges 42. However, it is understood that any suitable number of hinges 42 may be provided according to the teachings of the invention. In one exemplary embodiment, the cover may be coupled with one hinge 42 on the shorter sides 30, 32, and by two hinges 42 on the longer sides 31, 33. The number of hinges 42 used to couple the cover 10 to the main body 15 of the imaging device 12 may depend at least to some extent upon various design considerations, such as the size of hinge(s) 42 and cover 10.

Figure 3:
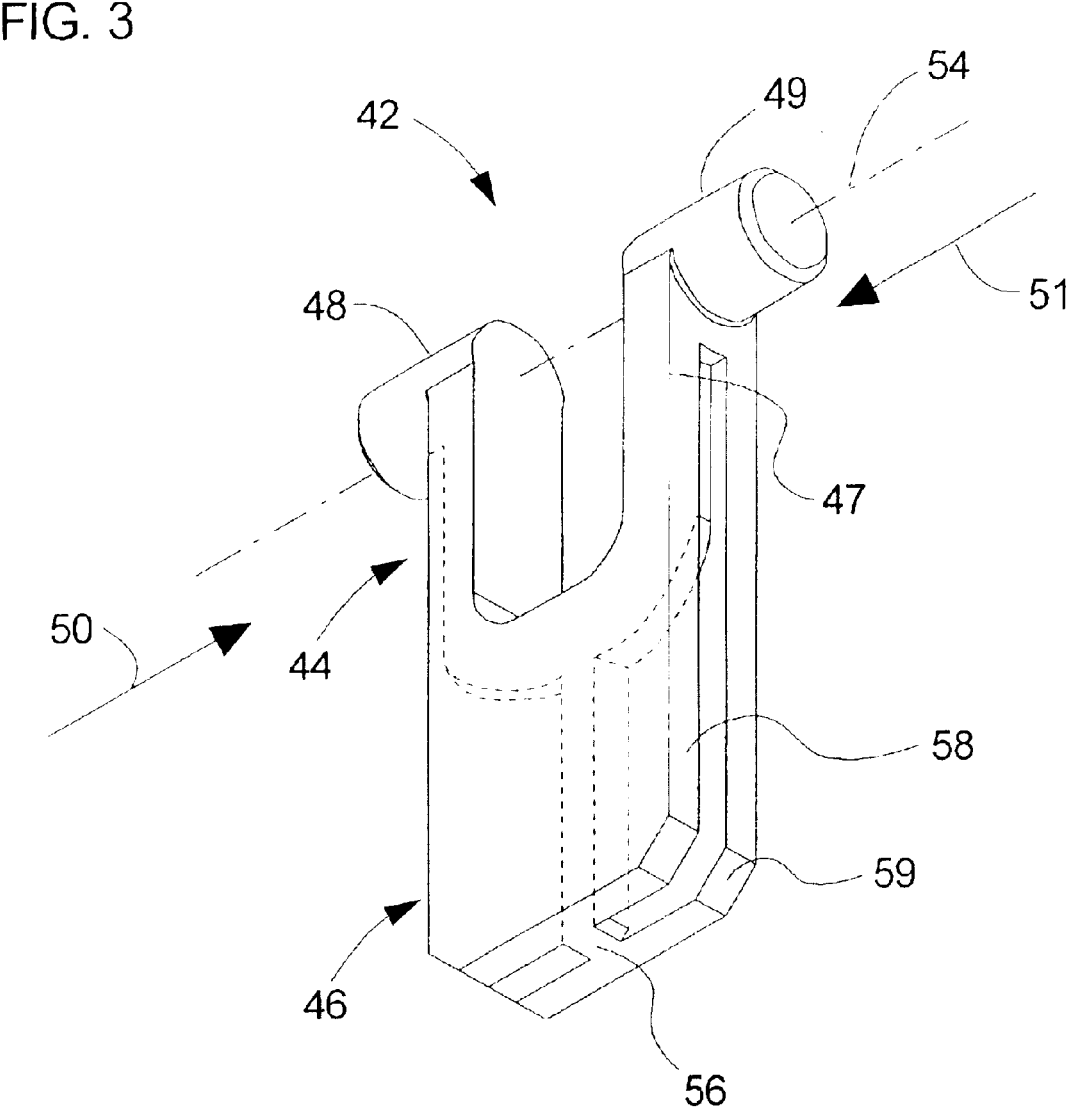
FIG. 3 is a perspective view of one embodiment of a hinge for coupling the cover to the imaging device.

A single-piece hinge 42 is shown in more detail in FIG. 3 according to one embodiment of the invention. Hinge 42 may be made of any suitable material, and preferably is fabricated from a plastic material. In other embodiments, however, hinge 42 may be fabricated from metal (e.g., stainless steel, aluminum), a combination of metal and plastic, or from any other suitable material(s). In any event, hinge 42 comprises a first portion 44 for engaging the frame assembly 40 of cover 10, and a second portion 46 for engaging the main body 15 of imaging device 12.

First portion 44 of the hinge 42 may comprise a substantially U-shaped support member 47 having one or more bearing members 48, 49 (e.g., cylindrical or rod-shaped members) mounted to each of the "legs" of the U-shaped support member 47. Bearing members 48, 49 may be received in any of the bearing fitting(s) 52 formed on the edges of frame assembly 40 of the cover 10.

According to one embodiment, the legs of the U-shaped portion 47 are flexible and may be pressed together (or "pinched") so that bearing members 48, 49 move toward one another as illustrated by arrows 50, 51 in FIG. 3. Hinge 42 can be attached to the cover 10 by pinching he legs together, positioning hinge 12 in bearing fitting 52 (FIG. 1 and FIG. 2), and then releasing the legs so that bearing members 48, 49 slide into and compressibly engage bearing fitting 52. Once connected, the cover 10 is pivotable about axis 54 in bearing fitting 52.

Hinge 42 can be removed from the cover 10 according to this embodiment by pinching the legs together and removing hinge 42 from the bearing fitting 52. It is readily apparent that the hinge 42 may be releasably mounted to the frame assembly 40 of cover 10 and can be readily moved to different sides of cover 10, preferably without the need to use tools.

Second portion 46 of the hinge 42 may comprise a substantially rectangular-shaped tab. In one embodiment, second portion 46 comprises a substantially Y-shaped member 56 sandwiched between opposing plate members 58, 59. Tab 46 may be slidably received in any of the slots 60 formed in housing 16 of the imaging device 12. Y-shaped member 56 serves to further stabilize the hinge 42 during operation. In any event, hinge 42 may be readily mounted to the main body 15 of imaging device 12 and readily disconnected and moved to different sides of the imaging device 12. Once connected, the cover 10 can be opened and closed adjacent the imaging surface 14.

The design of hinge 42 just described also enables the cover 10 to be expandably coupled to main body 15 of the imaging device 12. That is, when the image on imaging surface 14 is thick (e.g., a book or stack of papers), second portion 46 readily slides upward out of slot 60 so that cover 10 rests on the upper surface of the image. Accordingly, cover 10 need not be removed or held open during the imaging operation and still functions to reduce backlighting of the image and to reduce light from the illumination system reaching the user's eyes. In he event that the user desires to entirely remove cover 10 from the main body 15 of the imaging device (e.g., where the image is a thick book or oversize document), cover 10 may be readily removed for the imaging operation and then readily replaced for use again in other imaging operations.

It is noted that although the hinge 42 is described above with reference to different portions and features thereof, hinge 42 may be fabricated as a single member. In a preferred embodiment, the hinge 43 is injection molded from plastic. However, other embodiments are also contemplated as being within the scope of the invention. For example, hinge 42 may be assembled from separate members.

Of course it is understood that the second portion 46 of the hinge 42 may be attached to the cover 10, and the U-shaped portion 47 pinch-fit to the main body 15 of the imaging device.

As mentioned above, hinge 42 may be mounted in slots 60, 61 (hereinafter generally referred to as slots 60 unless referring in particular to slot 61) to couple cover 10 to the main body 15 of imaging device 12. Slots 60 may be provided adjacent the imaging surface 14 about the periphery of the main body 15 of the imaging device 12.

Slots 60 are provided on at least two, and preferably on each side 30–33 adjacent the imaging surface 14. Slots 60 are shown provided on three of four sides of the periphery of imaging surface 14 in FIG. 1 arid FIG. 2. Slots 60' are shown by dashed lines on the fourth side to indicate that the provision of slots 60 on one or more sides is optional. In any event, cover 10 is mounted to open and close in at least two different locations.

Figure 4A:
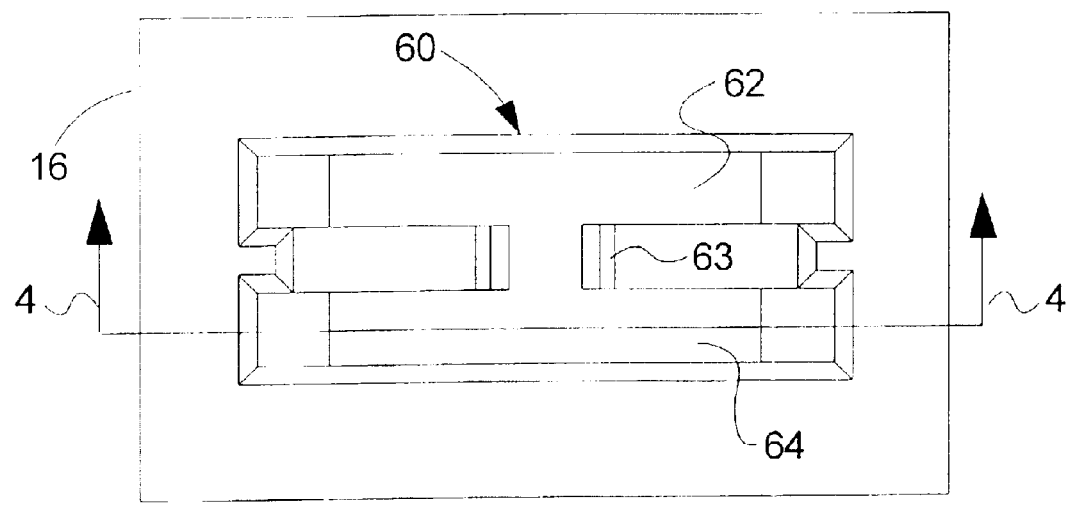
FIG. 4 shows an embodiment of a slot for connecting the hinge to the main body of the imaging device, wherein (a) is a top view, and (b) is a cut-away, side-view taken along line 4—4 in FIG. 4(a)
Figure 4B:
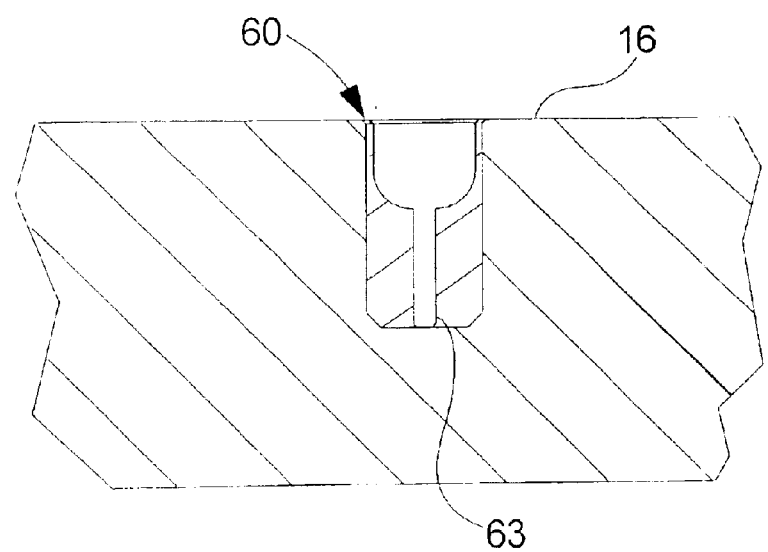

One of the slots 60 that may be provided on the main body 15 of imaging device 12 is shown in more detail in FIGS. 4(a) and 4(b) according to an embodiment of the invention. Slot 60 comprises parallel openings 62, 64 formed in housing 16 about the periphery of imaging surface 14, as shown in FIG. 1 and FIG. 2. Adjoining opening 63 is shown formed between openings 62, 64 to receive Y-shaped member 56 of hinge 42 (FIG. 3). In use, hinge 42 is inserted into slot 60 so that plates 58, 59 slidingly engage slots 62, 64, and Y-shaped member 56 slides into adjoining opening 63 to secure the hinge 42 to the main body 15 of the imaging device 12.

According to one embodiment of the invention, cover 10 can be mounted in one location on imaging device 12 (e.g., to open and close in the portrait orientation shown in FIG. 1), and readily moved (e.g., to open and close in the landscape orientation shown in FIG. 2), as follows. Cover 10 is removed from the main body 15 of imaging device 12 by lifting the cover upward and off of the main body 15. As cover 10 is lifted upward, the tab portion 46 of hinge 42 slides out of slot 60 and disconnects cover 10 from the main body 15 of imaging device 12.

The hinge(s) 42 may optionally be released from cover 10. For example, the user may pinch the U-shaped portion 47 of hinge 42 so that bearing members 48, 49 move toward one another in the direction of arrows 50, 51 and disengage from he bearing fittings 52 provided on the frame assembly 40 of cover 10. Accordingly, the cover 10, hinge(s) 42, and main body 15 of the imaging device 10 are each separated from one another.

Where the hinge(s) 42 have been removed from the cover, they may then be connected to another side of the cover 10. As described above, the user may pinch the U-shaped portion 47 of hinge 42 so that bearing members 48, 49 move toward one another in the direction of arrows 50, 51 enabling the hinge 42 to be inserted into and compressibly fit within bearing fitting 52 provided on the frame assembly 40 of cover 10. Bearing members 48, 49 engage the frame assembly 40 and enable cover 10 to pivot with respect to hinge 42 about axis 54. Cover 10 may then be replaced by sliding tab portion 46 into slot(s) 60 provided on another side of the main body 15 of imaging device 10. Accordingly, cover 10 is mounted in a different location on the main body 15 of imaging device 10.

In another exemplary embodiment, the hinge(s) 42 need not be removed in order for the cover 10 to be changed to another orientation. For example, the cover 10 may be lifted from the main body 15 of the imaging device 12, rotated 180 degrees, and then reattached to the main body 15. Alternatively, the cover 10 may be lifted from the main body 15 of the imaging device 12, shifted along the same side, and then reattached to the main body 15 (e.g., in slots 61 shown in FIG. 1).

Yet further embodiments are also contemplated as being within the scope of the present invention. In one exemplary embodiment, a plurality of hinges 42 may be formed as or otherwise permanently or semi-permanently (e.g., which "snap" into place) provided in different locations on the main body 15 of the imaging device 12 (e.g., about the perimeter of the imaging surface 14). The cover is attached to only those hinges 42 which allow the cover to open in the desired location. Preferably, according to such an embodiment, the hinges 42 provided on the main body 15 can be "hidden" or moved out of the way of operation. For example, the hinges 42 which are not being used may be rotated into recesses (not shown) formed in the main body 15 so that these hinges 42 do not interfere with operation of the cover 10. Accordingly, the cover 10 may be disengaged from one or more of the hinges. 42 fin a first location, and reattached to the hinges 42 already provided in another location. In the same regard, a plurality of hinges 42 may instead be formed as or otherwise permanently or semi-permanently provided in different locations on the cover 10.

In addition, the functions of the method described herein are not limited to being performed in any particular order. For example, hinge 42 may be removed from cover 10 before removing it from the main body 15 of imaging device 12.

Although the invention has been described herein with reference to a particular style hinge 42, it is understood that the invention is not limited to such an embodiment arid other embodiments are also contemplated as being within the scope of the invention. The particular hinge 42, and hence the corresponding connections on cover 10 and the imaging device 12 may depend upon various design considerations, such as but not limited to, the size and weight of cover 10, the desired durability, and cost considerations.

Figure 5:
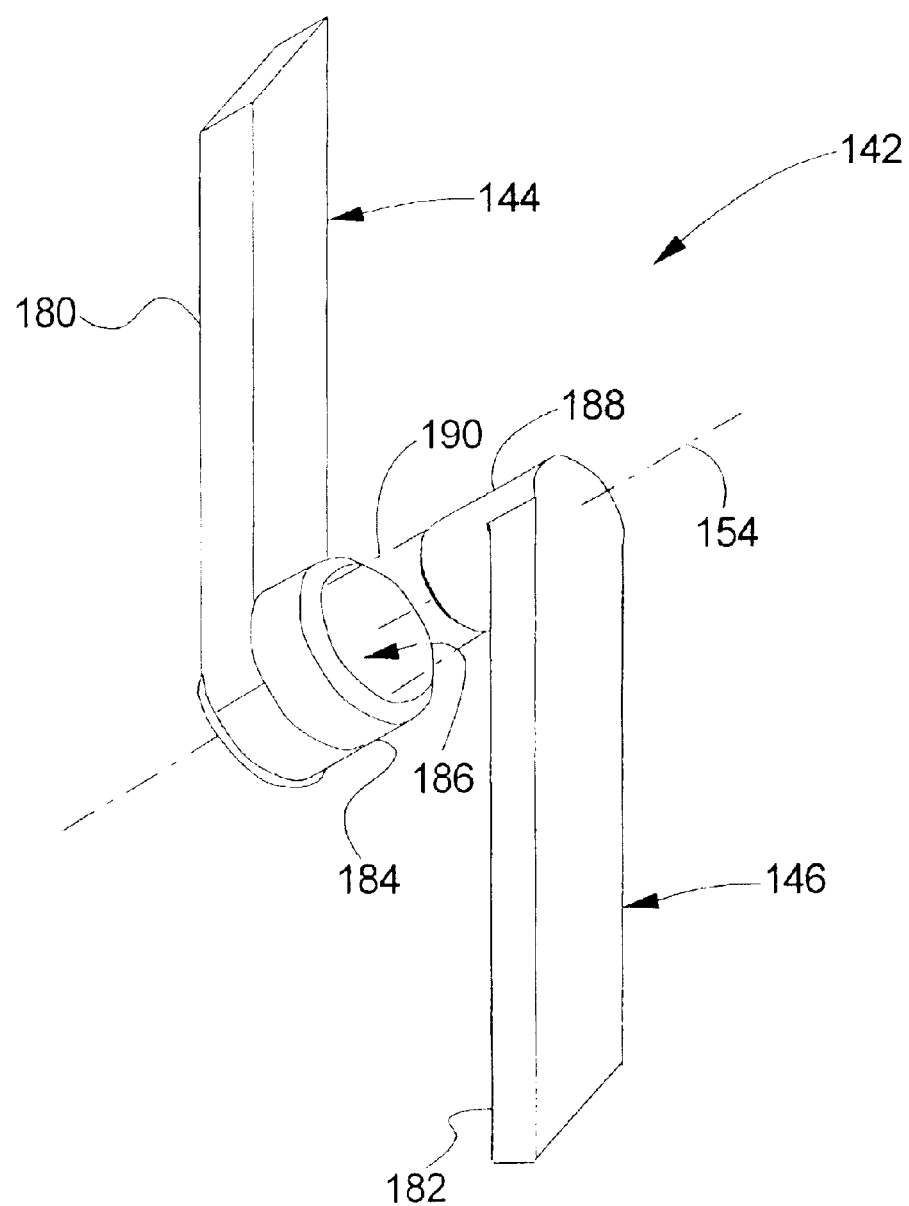
FIG. 5 is a perspective view of another embodiment of a hinge for coupling the cover to the imaging device.

Another embodiment of an exemplary hinge 142 that may be used according to the teachings of the invention is shown in FIG. 5. Again, hinge 142 is preferably fabricated from a plastic material. However, hinge 142 may be fabricated from any other suitable material or combination of materials.

Hinge 142 comprises a first portion 144 for engaging the frame assembly 40 of cover 10, and a second portion 145 for engaging the main body 15 of imaging device 12.

The first and second portions 144, 146 of hinge 142 comprises pins 180, 182 pivotally mounted to one another about axis 154. Each pin 180, 182 can be fitted into mating chambers formed in the frame assembly 40 of the cover and in the main body 15 of imaging device 10, respectively.

First portion 144 comprises a head portion 184. An opening 186 is formed in head portion 184. Second portion 146 comprises a mating head portion 188. The first and second portions 144, 146 can be assembled by inserting mating head portion 188 into opening 186, as illustrated by dashed lines 190. Preferably, mating head portion 188 "snaps" into place within opening 186 so that first and second portions 144, 146 do not separate from one another during use. For example, a ridge may be provided on mating head 188 which is engaged in a channel formed within openings 186. In any event, first and second portions 144, 146 can be pivoted with respect to one another about axis 154.

Accordingly, hinge 142 may be used to couple cover 10 to the main body 15 of imaging device 12. In addition, hinge 142 is readily removable from both the cover 10 and the main body 15 so that cover 10 can be remounted in another location on the main body 15.

According to the teachings of the invention, cover 12 is not limited to being opened and closed on only one side of the imaging device 12. Instead, the cover can be moved to other locations on the imaging device so that it can be opened without compromising access to the imaging surface. Accordingly, imaging device 12 may be arranged in any desirable location regardless of its surroundings.

What is claimed is:

1. A cover for an imaging device, comprising:
   a frame assembly; and
   at least one hinge releasably mounted to said frame assembly, said at least one hinge pivotally coupling said frame assembly in one location on the imaging device, said at least one hinge readily removable from said frame assembly and remountable to couple said frame assembly in another location on the imagine device.

2. The cover of claim 1, wherein said locations are about an imaging surface of the imaging device.

3. The cover of claim 1, wherein said hinge expandably couples said frame assembly to the imaging device.

4. The cover of claim 1, wherein said at least one hinge comprises a tab insertable into any of a plurality of slots provided on the imaging device.

5. The cover of claim 1, wherein said frame assembly has a bearing fitting on at least two different locations thereof, and said at least one hinge has at least one bearing member receivable within any of said bearing fittings.

6. The cover of claim 1, wherein said at least one hinge comprises a substantially U-shaped portion, said substantially U-shaped portion flexibly engaging said frame assembly.

7. The cover of claim 1, wherein said at least one hinge slidably engages the imaging device.

8. An imaging device, comprising:
   an imaging surface;
   a cover movable between an open position and a closed position adjacent said imaging surface; and
   at least one hinge pivotally connecting said cover in a first location adjacent said imaging surface, said at least one hinge removable for reconnecting said cover in at least a second location adjacent said imaging surface.

9. The imaging device of claim 8, further comprising a plurality of slots provided adjacent said imaging surface, said plurality of slots for receiving said at least one hinge to connect said cover adjacent said imaging surface.

10. The imaging device of claim 9, wherein said at least one hinge slidably engages at least one of said plurality of slots.

11. The imaging device of claim 8, further comprising a plurality of hinges provided at least semi-permanently on said cover, said at least one hinge selected from said plurality of hinges.

12. The imaging device of claim 8, further comprising a plurality of hinges provided at least semi-permanently adjacent said imaging surface, said at least one hinge selected from said plurality of hinges.

13. An imaging device, comprising:
    an imaging surface;
    a cover for said imaging surface; and
    at least one hinge pivotally connecting said cover, each hinge having first and second portions, the first portion of said hinge having at least one bearing member pivotally engaging a bearing fitting of said cover, and the second portion of said hinge slidably engaging a slot adjacent said imaging surface.

14. The imaging device of claim 13, wherein each bearing member comprise first and second pins, said first pin slidable into a first mating chamber of the bearing fitting and said second pin slidable into a second mating chamber of the bearing fitting.

15. The imaging device of claim 13, wherein said first and second pins are mounted on an axis thereby pivotally connecting said cover.

16. The imaging device of claim 13, wherein said first portion of said at least one hinge comprises a substantially U-shaped support member having at least one bearing member mounted to each leg of said substantially U-shaped support member.

17. The imaging device of claim 13, wherein said at least one hinge comprises a second portion having a substantially rectangular-shaped tab.

18. The imaging device of claim 13, wherein said at least one hinge comprises a tab having a substantially Y-shaped member sandwiched between opposing plate members.

19. The imaging device of claim 13, wherein said at least one hinge compressibly engages said cover.

20. An imaging device, comprising:
    imaging means;
    cover means for covering said imaging means; and
    hinge means for pivotally coupling said cover means adjacent said imaging means in at least two different locations, said hinge means having at least one bearing member pivotally engaging a bearing fitting of said cover means.

21. The imaging device of claim 20, wherein said hinge means is removably mounted to said cover means.

22. The imaging device of claim 20, further comprising:
    hinge-connecting means for releasably connecting said hinge means to said cover means; and
    hinge-connecting means for releasably connecting said hinge means to said imaging means.

23. A method for changing the orientation a cover opens and closes on an imaging device, comprising:
    removing the cover from the imaging device, the cover opening and closing in one orientation;
    disconnecting at least one hinge from one side of the cover;
    reconnecting the at least one hinge to another side of the cover; and
    replacing the cover on the imaging device to open and close in another orientation.

24. A method for changing the location of a cover on an imaging device, comprising:
    sliding a hinge out of first receiving chamber to remove the cover from a first location on the imaging device; and
    sliding the hinge into a second receiving chamber to replace the cover in a second location on the imaging device.

* * * * *